US007003617B2

(12) United States Patent
Golasky et al.

(10) Patent No.: US 7,003,617 B2
(45) Date of Patent: Feb. 21, 2006

(54) SYSTEM AND METHOD FOR MANAGING TARGET RESETS

(75) Inventors: Richard Golasky, Round Rock, TX (US); Jacob Cherian, Austin, TX (US); Nam Nguyen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 339 days.

(21) Appl. No.: 10/361,979

(22) Filed: Feb. 11, 2003

(65) Prior Publication Data

US 2004/0158668 A1   Aug. 12, 2004

(51) Int. Cl.
G06F 13/36 (2006.01)
(52) U.S. Cl. ............... 710/315; 710/305; 710/312; 714/9; 714/23; 714/25; 714/43; 709/208
(58) Field of Classification Search ............ 710/305, 710/312, 315; 714/25; 709/208
See application file for complete search history.

(56) References Cited

U.S. PATENT DOCUMENTS

| 5,881,281 | A   |   | 3/1999  | Gates et al. ............ 395/651 |
| 6,038,687 | A   | * | 3/2000  | Ho ....................... 714/30 |
| 6,148,421 | A   | * | 11/2000 | Hoese et al. ............ 714/50 |
| 6,246,666 | B1  |   | 6/2001  | Purcell et al. .......... 370/221 |
| 6,256,695 | B1  | * | 7/2001  | Williams ................ 710/107 |
| 6,370,644 | B1  | * | 4/2002  | LaBerge ................. 713/1 |
| 6,470,007 | B1  | * | 10/2002 | Berman .................. 370/351 |
| 6,496,890 | B1  |   | 12/2002 | Azevedo et al. ........ 710/110 |
| 6,567,879 | B1  | * | 5/2003  | Benson et al. .......... 710/305 |
| 6,715,019 | B1  | * | 3/2004  | Benson et al. .......... 710/305 |
| 6,725,394 | B1  | * | 4/2004  | Bolt .................... 714/7 |
| 6,760,788 | B1  | * | 7/2004  | Knight .................. 710/19 |
| 6,772,329 | B1  | * | 8/2004  | Hadley .................. 713/1 |
| 2002/0032825 | A1 |  | 3/2002  | Saze et al. ............. 710/300 |
| 2002/0129232 | A1 | * | 9/2002  | Coffey .................. 713/1 |
| 2003/0093721 | A1 | * | 5/2003  | King et al. ............. 714/42 |
| 2003/0126396 | A1 | * | 7/2003  | Camble et al. .......... 711/173 |
| 2003/0188070 | A1 | * | 10/2003 | Delaney ................. 710/305 |
| 2004/0054838 | A1 | * | 3/2004  | Hoese et al. ........... 710/305 |

OTHER PUBLICATIONS

"Working Draft: Information Technology—Small Computer System Interface—2," Sep. 7, 1993, Computer & Business Equipment Manufacturers Association, p. xxix-xxxi, 1, and 71-90.*

"Automatic Target Mode for the Small Computer System Interface," Oct. 1, 1990, IBM Technical Disclosure Bulletin, vol. 33, Issue 5, p. 130-133.*

(Continued)

*Primary Examiner*—Rehana Perveen
*Assistant Examiner*—Donna K. Mason
(74) *Attorney, Agent, or Firm*—Hamilton & Terrile, LLP; Robert W. Holland

(57) ABSTRACT

A bus reset control module associated with a fibre-SCSI bridge manages target resets sent from a fibre bus to one or more SCSI buses to reduce or eliminate unnecessary bus resets of SCSI buses having sequential devices, such as tape storage drives. The bus reset control module accepts target resets from a fibre bus host to intercept the initiation of bus resets and communicates with target devices of the SCSI bus to determine whether the target devices are faulty. The bus reset control module issues bus resets to SCSI buses having a faulty target device but prevents issuance of bus resets to SCSI buses that do not have a faulty target device so that a sequential device interfaced with a SCSI bus is not subject to a bus reset if all devices associated with the SCSI bus are operating properly.

20 Claims, 2 Drawing Sheets

OTHER PUBLICATIONS

"Recovering from SCSI Bus Errors on Sequential Access Devices," Feb. 1, 1994, IBM Technical Disclosure Bulletin, vol. 37, Issue 2B, p. 361-364.*

Hoese, Geoffrey B., "Fibre Channel to SCSI Addressing," Apr. 1998, Computer Technology Review, vol. 18, No. 4, p. 36 and 38.*

* cited by examiner

SYSTEM AND METHOD FOR MANAGING TARGET RESETS

BACKGROUND OF THE INVENTION

1. Field of the Invention

The present invention relates in general to the field of information handling system networks, and more particularly to a system and method for managing target resets.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One information handling system solution for storing and accessing data is a fibre channel storage area network (SAN) environment which interfaces information from a host information handling system through a host bus adapter (HBA), a fibre channel bus, a fibre-SCSI bridge appliance and through plural SCSI buses to multiple storage servers and clusters. In a typical fibre channel SAN, primary storage disk arrays interact through the HBA to support host device storage and access of information while tape storage drives backup the information stored on the primary storage disk arrays to recover in the event of network or device failures. For instance, multiple servers and/or clusters in a fibre channel SAN environment typically share tape devices or tape device libraries for back-up operations. Typical Fibre Channel-to-SCSI bridges make is possible to connect multiple SCSI devices to a single Fibre Channel device. The bridge presents itself as a fibre channel target with the attached SCSI devices.

One difficulty with interfacing primary storage disk arrays and tape drives within a fibre channel SAN environment is that tape drives are sequential devices that may have difficulty responding to target resets issued from a host bus adapter. In a fibre channel environment, a target reset command is a common operation for recovering from bus errors, timeouts, and misbehaving target devices such as disk and tape drives. Target reset commands issued from a host bus adapter are typically translated to bus resets initiated on FC-SCSI buses by the fibre-SCSI bridge. Target resets are generally effective for clearing error conditions of non-sequential target devices, such as disk drives, but often have adverse effects on sequential target devices, such as tape drives. Typically, a host bus adapter does not know the individual target device that causes an error and so the host bus adapter sends a target reset command to all target devices operating under a target ID, generally resulting in target reset being translated into a bus reset for each FC-SCSI bus interfaced with a SCSI bridge. If multiple target devices associated with a SCSI bridge operate under the same target ID, each target device is typically subjected to a bus reset. Primary storage disk arrays are generally able to recover from target reset commands with or without input/output in progress by relying on error recovery techniques in the host bus adapter and host application. However, sequential devices may have difficulty recovering target resets while conducting input/output operations with a target reset often causing the reset of mode parameters on tape devices, the release of SCSI reservations on targets and the altering of block position on media during read and write operations. Target resets on sequential devices have an unnecessarily severe impact when the sequential devices were not misbehaving or in need of a reset. One available solution for avoiding such destructive resets is to mask target resets from reaching sequential target devices by filtering target resets from being sent by the appliance to target devices associated with a sequential target device peripheral ID. However, masking of target resets prevents both unnecessary and necessary sequential device resets.

SUMMARY OF THE INVENTION

Therefore a need has arisen for a system and method which prevents a host bus adapter target reset from being populated onto SCSI buses that do require a reset.

A further need exists for a system and method which identifies the SCSI bus or buses in a multi-bus environment that require a bus reset when the host bus adapter sends a target reset.

In accordance with the present invention, a method and system are provided which substantially reduce the disadvantages and problems associated with previous methods and systems for managing fibre channel bus target resets issued to a FC-SCSI bridge. The buses interfaced with the bridge are diagnosed to identify buses having faulty target devices so that bus resets are issued to SCSI buses having faulty target devices and without having to populate bus resets to SCSI buses that do not have faulty devices.

More specifically, a bus reset control module associated with a fibre-SCSI bridge information handling system intercepts target resets issued from a host bus adapter through a fibre channel bus. The bus reset control module diagnoses SCSI buses that interface with sequential target devices, such as tape backup devices, to identify the SCSI bus or buses having a faulty target device and then resets the SCSI buses with the faulty target devices while precluding the reset of SCSI buses that do not have faulty target devices. The bus reset control module diagnoses target devices of SCSI buses by issuing an abort command to each SCSI bus to interrupt input/output operations in a manner that is recoverable by the host tape backup application and the sequential target devices. The bus reset control module issues an inquiry command to each target device and identifies as faulty the target devices that fail to respond to the inquiry command. The bus reset control module also issues a test unit ready command to each target device and identifies as faulty the target devices that fail to respond. The test unit ready command may include a check condition to verify sense data for identifying hardware faults. The bus reset control module resets the SCSI buses having an associated faulty target device and then returns a complete status to the host bus adapter target reset to allow the sequential target devices that were not reset to recover input/output operations from the abort state.

The present invention provides a number of important technical advantages. One example of an important technical advantage is that the bus reset control module prevents a host bus adapter target reset from being populated as SCSI bus resets onto SCSI buses that do require a reset. The bus reset control module validates the operation of target devices of a SCSI bus before issuing a reset so that sequential target devices associated with the SCSI bus are not subjected to unnecessary destructive bus resets where all target devices of the SCSI bus are operating correctly.

Another example of an important technical advantage of the present invention is that the bus reset control module identifies the SCSI bus or buses in a multi-bus environment that require a bus reset when the host bus adapter sends a target reset to the fibre-SCSI bridge. The diagnosis of target devices to identify buses having faulty target devices allows selective bus resets so that SCSI buses that have no faulty target devices avoid unnecessary bus resets that are catastrophic to sequential target devices such as tape storage drives.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Sequential devices, such as tape storage devices, interfaced with one or more SCSI buses avoid destructive resets issued from a fibre channel bus by intercepting target resets from the fibre channel bus and issuing bus resets only to SCSI buses having a faulty target device. A bus reset control module disposed between the fibre channel and SCSI buses, such as in a fibre-SCSI bridge information handling system, determines the SCSI bus or buses having a faulty target device and resets those buses while preventing the issue of bus resets to SCSI buses having no faulty target devices. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
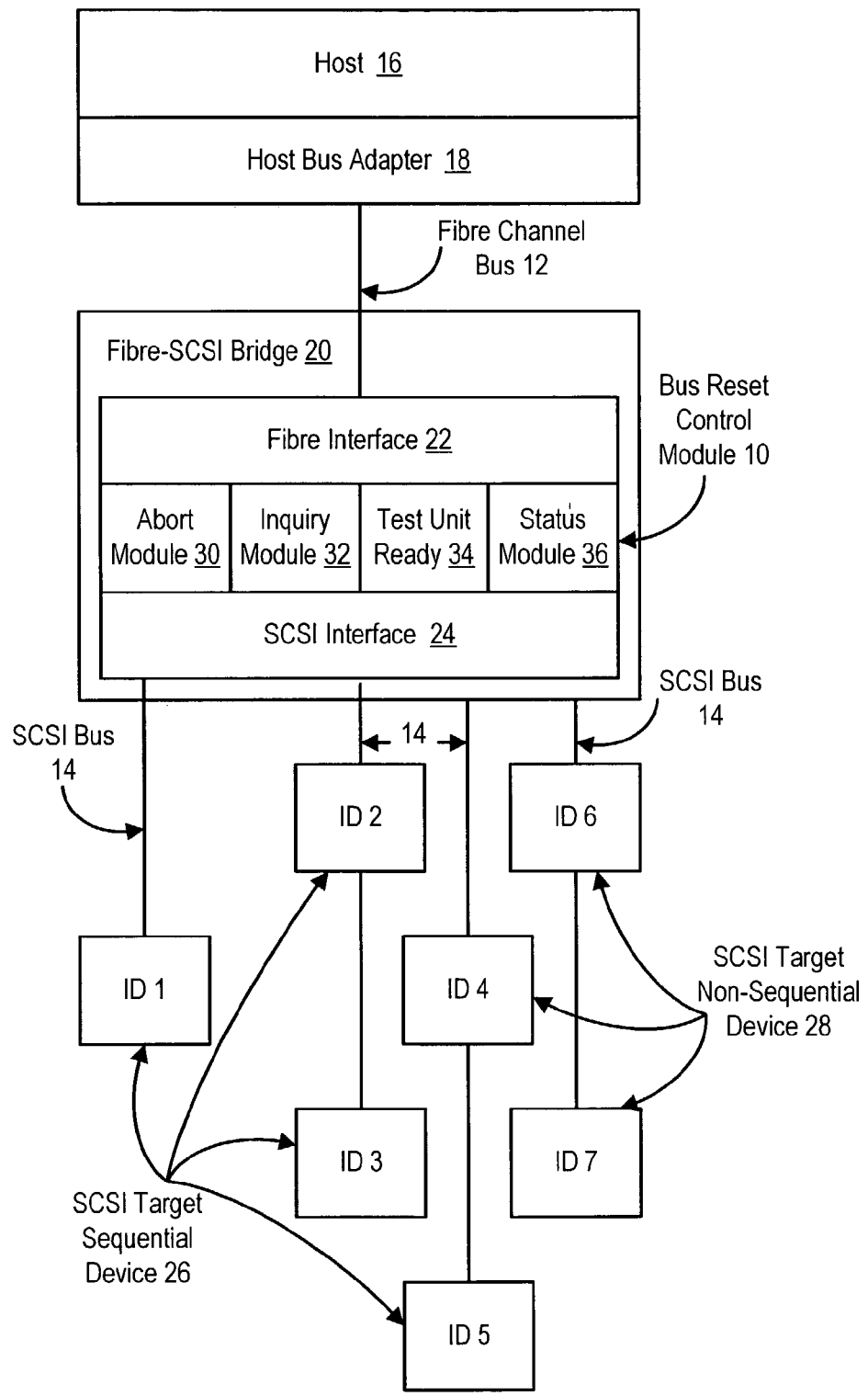
FIG. 1 depicts a block diagram of a bus reset control module disposed between a fibre channel bus and SCSI buses having sequential target devices.

Referring now to FIG. 1, a block diagram depicts a bus reset control module 10 disposed between a fibre channel bus 12 and SCSI buses 14. Information to and from a host device 16 is communicated through a host bus adapter (HBA) 18 to a fibre interface 22 of a fibre-SCSI bridge information handling system 20. Fibre-SCSI bridge information handling system 20 communicates the information to and from SCSI target sequential and non-sequential devices 26 and 28 through an SCSI interface 24 and SCSI buses 14. SCSI sequential devices 26 are, for instance, tape storage information handling systems that backup information from host 16 on storage tapes. SCSI non-sequential devices 28 are, for instance, primary storage disk array information handling systems that support network storage of information such as in a fibre channel storage area network (SAN) environment.

During network storage operations, HBA 18 issues target reset commands for recovering from bus errors, timeouts and misbehaving target devices. The bus reset control module intercepts the target reset commands, diagnoses target devices to identify SCSI buses having faulty target devices, and selectively issues SCSI bus resets to SCSI buses having a faulty target device, thus allowing SCSI buses that do not have faulty target devices to continue input/output operations. Target reset commands from fibre channel bus 12 are intercepted by the Fibre-SCSI Bridge 20 then abort module 30 which issues an SCSI abort command function to each SCSI bus 14. The abort command interrupts current target input/output operations without a reset of target device parameters so that the operations may continue from the aborted state. An inquiry module 32 ten sends an inquiry command to each target and determines if each target device responds with a good status. Target devices that fail to respond to the inquiry command result in a bus reset issued to the SCSI bus 14 associated with the target device. If all target devices of a bus respond to the inquiry command, a test unit ready module 34 sends a test unit ready command to each target device and determines if each target device responds with a good status. Test unit ready module 34 issues a bus reset to each SCSI bus 14 having a target device that fails to respond to the test unit ready command. If each target device associated with a SCSI bus 14 responds with a good status, than the devices and SCSI buses are considered to be operational and no further action is taken. In the event that a check condition is returned from a test unit ready command, the sense data is further analyzed to determine if there is a hardware error. If the sense data indicates a hardware error, than a bus reset is issued. Bus reset control module 10 tracks validation of the operation of each SCSI bus 14 with a status module 36 that returns a target reset status to host bus adapter 18 once each target device is diagnosed and SCSI buses 14 associated with one or more failed target devices have been reset In this manner, a bus reset is issued to a SCSI bus only if the SCSI bus interfaces with a faulty target device, thus protecting SCSI buses that do not require a reset once status module 36 returns a complete status to host bus adapter 18. sequential target devices associated with non-reset buses continue with input/output operations temporarily aborted by the abort command without undergoing a destructive bus reset. As depicted by FIG. 1, bus reset control module 10 prevents unecessary bus resets in response to fibre channel bus target reset commands whether initiated due to target device failures associated with SCSI buses having only sequential target devices 26 such as tape storage drives, only non-sequential target devices 28 and a mix of both sequential and non-sequential target devices. In an alternative embodiment, bus reset control module 10 diagnoses only those SCSI buses 14 associated with sequential target devices so that bus resets are issued to SCSI buses that have only non-sequential target devices to reduce delays introduced by the diagnosis of non-sequential target devices that are able to handle bus resets in a non-destructive manner.

Figure 2:
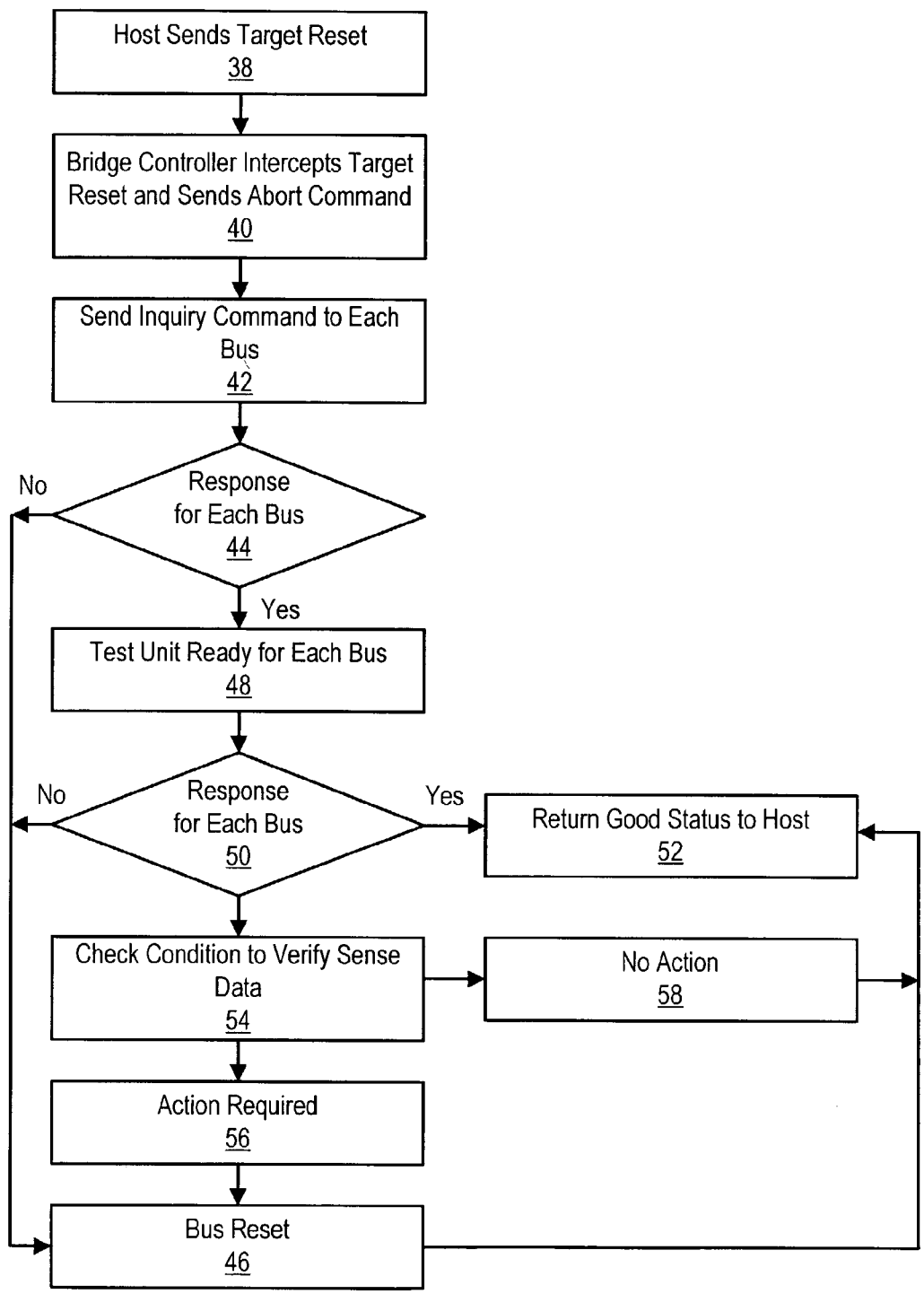
FIG. 2 depicts a flow diagram of a process for selectively issuing SCSI bus resets in response to a fibre channel bus target reset.

Referring now to FIG. 2, a flow diagram depicts a process for selectively issuing SCSI bus resets in response to a fibre channel bus target reset. The process begins at step 38 with host bus adapter 18 sending a target reset through fibre channel bus 12 in response to bus errors, timeouts or misbehaving target devices such as disk drives or tape drives. At step 40, bus reset control module 10 of fibre-SCSI bridge information handling system 20 intercepts the target reset command and issues an abort command to each target device interfaced with a SCSI bus associated with bridge information handling system 20. The abort command ceases input/output operations on target devices in a non-destructive manner to allow analysis of the target devices for identification of SCSI buses having one or more faulty target devices. Sequential devices, such as tape storage drives, in conjunction with the tape backup software application are able to restart input/output operations from an aborted state.

At step 42, diagnosis of the target devices is initiated by sending an inquiry command to each SCSI bus. At step 44, a determination is made for each SCSI bus of whether all target devices associated with the SCSI bus provided a response to the inquiry command. If a target device associated with a SCSI bus fails to respond to the inquiry command, then the process continues to step 46 for the issue of a bus reset to the bus with the faulty target device. For instance, if only sequential target device 26 with ID4 failed to respond to the inquiry command, then only target devices with ID4 and ID5 would be subject to a bus reset. For remaining buses that have all target devices respond to the inquiry command, the process continues to step 48 at which a test unit ready command is issued to each remaining SCSI bus. At step 50, a determination is made for each remaining SCSI bus of whether all target devices associated with each remaining SCSI bus provided a response to the test unit ready command. If a target device associated with a SCSI bus fails to respond to the test unit ready command, then the process continues to step 46 for the issue of a bus reset to the bus with the faulty target device. If a SCSI bus has all target devices respond properly to the inquiry and test unit ready commands, then at step 52 the status for that bus is set as good. In one embodiment, the process may include a check condition response at step 54 which is sent back to the test unity ready module 34 which provides data as to the status of the device. If the sense data indicates a hardware error, then at step 56 an action required to correct the hardware failure is noted and the process continues to step 46 for a bus reset of the bus associated with the target device having the hardware failure. If at step 54 the sense data does not indicate a hardware error, no action needed is noted at step 58 and a good status is returned at step 52.

Once each SCSI bus has been diagnosed as good, either because each target device of a SCSI bus responded properly to the inquiry and test unit ready commands or because the SCSI bus was reset to have the target devices associated with the bus reset, the target reset status good is returned to the host to allow the continuation of input/output operations. Sequential target devices that are not subjected to a bus reset are able to recover from the aborted input/output operations. Thus, performing bus diagnosis before issuing bus resets improves sequential target device performance by avoiding unnecessary destructive bus resets where all target devices of a SCSI bus are operating properly.

Although the present invention has been described in detail, it should be understood that various changes, substitutions and alterations can be made hereto without departing from the spirit and scope of the invention as defined by the appended claims.

What is claimed is:

1. A system for managing fibre channel target resets issued to SCSI sequential devices, the system comprising:
    a host device operable to communicate information to target devices and to issue target resets for recovery from errors in the communication of information;
    a fibre channel bus interfaced with the host device and operable to communicate the target resets;
    a fibre-SCSI bridge interfaced with the fibre channel bus and operable to accept the target resets and execute bus resets for associated SCSI buses;
    plural SCSI buses interfaced with the fibre-SCSI bridge;
    one or more sequential target devices interfaced with each SCSI bus; and
    a bus reset control module associated with the fibre-SCSI bridge and operable to determine whether one or more of the SCSI buses have a faulty target device when the host issues a target reset, the bus reset control module further operable to issue bus resets to SCSI buses having a faulty target device and precluding the issue of bus resets to SCSI buses lacking a faulty target device.

2. The system of claim 1 wherein the sequential target device comprises a tape storage drive.

3. The system of claim 2 wherein the bus reset control module comprises:
    an abort module operable to intercept the target reset from communicating with the SCSI buses and to issue an abort task to each SCSI bus;
    an inquiry module operable to issue an inquiry command to each SCSI bus to determine whether targets of each SCSI bus are responding;
    a test unit ready module operable to issue a test unit ready command to each SCSI bus to determine whether targets of each SCSI bus are responding; and
    a status module interfaced with the inquiry module and test unit ready module and operable to issue a bus reset to SCSI buses having non-responding targets and to return stats to the target reset of the host device.

4. The system of claim 3 wherein the test unit ready module is further operable to issue a check condition command to each SCSI bus to determine whether sense data of target devices report hardware errors, and the status module is further operable to issue a bus reset to SCSI buses having targets with a hardware error.

5. The system of claim 4 wherein the status module is further operable to issue a message identifying target devices having hardware errors.

6. The system of claim 2 wherein the host issues target resets on detection of bus errors.

7. The system of claim 2 wherein the host issues target resets on detection of target timeouts.

8. The system of claim 2 wherein the host issues target resets on detection of target device errors.

9. A method for managing sequential devices interfaced with a fibre bus, the method comprising:
   intercepting a target reset issued from the fibre bus to target devices;
   determining whether one or more target devices are faulty;
   issuing bus resets to buses associated with a faulty target device; and
   preventing the issue of bus resets to buses associated with sequential devices and not associated with a faulty target device.

10. The method of claim 9 wherein the sequential devices comprise tape storage drives.

11. The method of claim 9 wherein the bus associated with sequential devices comprises an SCSI bus.

12. The method of claim 11 wherein determining whether one or more target devices are faulty further comprises:
   issuing an abort task command to each SCSI bus associated with a sequential device;
   issuing an inquiry command to each target device associated with the SCSI bus having a sequential device; and
   determining that a target device has failed if the target device fails to respond to the inquiry command.

13. The method of claim 11 wherein determining whether one or more target devices are faulty further comprises:
   issuing an abort task command to each SCSI bus associated with a sequential device;
   issuing an test unit ready command to each target device associated with the SCSI bus having a sequential device; and
   determining that a target device has failed if the target device fails to respond to the test unit ready command.

14. The method of claim 13 wherein determining whether or not one or more target devices are faulty further comprises:
   issuing a check condition to each target device that responds to the test unit ready command; and
   determining that a target device has failed if sense data associated with a target device reports a hardware error.

15. The method of claim 9 further comprising:
   responding to the target reset wit a complete status.

16. A network bridge comprising:
   a fibre interface operable to communicate information with a fibre bus;
   a SCSI interface operable to communicate information with one or more SCSI buses;
   a bus reset control module operable to manage target resets from the fibre interface to the SCSI bus by accepting target resets through the fibre interface, communicating with target devices through the SCSI interface to determine whether the target devices are faulty, withholding a bus reset from at least one SCSI bus that does not have a faulty target device, and issuing a bus reset through the SCSI interface to SCSI buses having faulty target devices.

17. The network bridge of claim 16 wherein the bus reset control module further manages target resets by preventing the issuing of bus resets to SCSI buses having no faulty devices.

18. The network bridge of claim 16 wherein the bus reset control module further manages target resets by determining whether or not each SCSI bus has a faulty device and then communicating a target reset status through the fibre interface.

19. The network bridge of claim 16 wherein determining whether target devices are faulty comprises determining whether target devices respond to an inquiry command.

20. The network bridge of claim 16 wherein the target devices comprise sequential tape drives.

* * * * *